(12) United States Patent
Ratner

(10) Patent No.: US 12,427,942 B2
(45) Date of Patent: Sep. 30, 2025

(54) METHODS AND APPARATUS FOR VEHICLE MOTION MITIGATION DURING IMPACT

(71) Applicant: Nuro, Inc., Mountain View, CA (US)

(72) Inventor: Daniel Jason Ratner, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 266 days.

(21) Appl. No.: 17/680,754

(22) Filed: Feb. 25, 2022

(65) Prior Publication Data

US 2022/0355754 A1 Nov. 10, 2022

Related U.S. Application Data

(60) Provisional application No. 63/185,551, filed on May 7, 2021.

(51) Int. Cl.
| | | |
|---|---|---|
| *B60R 21/0134* | (2006.01) | |
| *B60R 21/00* | (2006.01) | |
| *B60R 21/01* | (2006.01) | |
| *B60R 21/0136* | (2006.01) | |
| *B60W 30/095* | (2012.01) | |
| *B60W 60/00* | (2020.01) | |

(52) U.S. Cl.
CPC ...... *B60R 21/0134* (2013.01); *B60R 21/0136* (2013.01); *B60W 30/0956* (2013.01); *B60W 60/0016* (2020.02); *B60R 2021/0006* (2013.01); *B60R 2021/0065* (2013.01); *B60R 2021/01252* (2013.01)

(58) Field of Classification Search
CPC ............ B60R 21/0134; B60R 21/0136; B60R 2021/0006; B60R 2021/0065; B60R 2021/01252; B60W 60/0016; B60W 30/0956
See application file for complete search history.

(56) References Cited

U.S. PATENT DOCUMENTS

| | | | |
|---|---|---|---|
| 4,066,151 A | | 1/1978 | Liebscher et al. |
| 4,265,338 A | | 5/1981 | Shea et al. |
| 4,317,507 A | | 3/1982 | McMillan |
| 5,439,076 A | | 8/1995 | Percy, Jr. |
| 5,444,949 A | | 8/1995 | Ciaccio |
| 6,158,556 A | * | 12/2000 | Swierczewski ........... B60T 1/14 293/107 |

(Continued)

FOREIGN PATENT DOCUMENTS

| | | |
|---|---|---|
| DE | 3437402 A1 | 4/1986 |
| DE | 102005009949 A1 | 9/2006 |
| WO | 2017117303 A1 | 7/2017 |

*Primary Examiner* — James J Lee
*Assistant Examiner* — Steven Vu Nguyen
(74) *Attorney, Agent, or Firm* — Edell, Shapiro & Finnan, LLC

(57) ABSTRACT

According to one aspect, a method includes identifying a condition relating to an impact on a vehicle by an object, the vehicle including at least one anchor mechanism, the at least one anchor mechanism configured to anchor the vehicle to a surface. The method also includes determining whether the condition indicates that the anchor mechanism is to be deployed, and deploying the anchor mechanism when it is determined that the condition indicates that the anchor mechanism is to be deployed.

12 Claims, 17 Drawing Sheets

(56) References Cited

U.S. PATENT DOCUMENTS

| | | |
|---|---|---|
| 9,487,190 B1 | 11/2016 | Alvarado |
| 10,369,976 B1* | 8/2019 | Ratner ................... B60T 1/14 |
| 11,577,718 B1* | 2/2023 | Edren ............... B60W 30/0956 |
| 2006/0074536 A1* | 4/2006 | Shen .................. B60R 21/0132 |
| | | 701/45 |
| 2008/0136133 A1 | 6/2008 | Takahashi |
| 2010/0084426 A1 | 4/2010 | Devers et al. |
| 2011/0017538 A1 | 1/2011 | Baumann |
| 2011/0155496 A1 | 6/2011 | Baumann et al. |
| 2011/0198161 A1 | 8/2011 | Lomazzo |
| 2011/0231067 A1* | 9/2011 | Itoga .................. B60R 21/0134 |
| | | 701/46 |
| 2013/0037355 A1 | 2/2013 | Baker et al. |
| 2014/0081445 A1 | 3/2014 | Villamar |
| 2014/0191078 A1 | 7/2014 | Boren et al. |
| 2015/0006005 A1 | 1/2015 | Yu et al. |
| 2016/0325783 A1* | 11/2016 | Richert ................ B60W 30/09 |
| 2017/0101095 A1 | 4/2017 | Nilsson et al. |
| 2017/0174343 A1 | 6/2017 | Erickson et al. |
| 2018/0126983 A1* | 5/2018 | Beauvais ............... B60W 10/20 |
| 2019/0210595 A1* | 7/2019 | Cheaz .................. B60W 40/06 |
| 2019/0263365 A1 | 8/2019 | Krasnoff |
| 2019/0344739 A1* | 11/2019 | Freienstein ....... B60R 21/01558 |
| 2019/0345682 A1* | 11/2019 | Rothschild ............. E01F 13/12 |
| 2020/0139963 A1* | 5/2020 | Kim ..................... B60W 10/20 |
| 2021/0139018 A1* | 5/2021 | Schwindt ............... H04W 4/38 |
| 2022/0244736 A1* | 8/2022 | Konrardy ............... G06Q 40/08 |

\* cited by examiner

METHODS AND APPARATUS FOR VEHICLE MOTION MITIGATION DURING IMPACT

PRIORITY CLAIM

This patent application claims the benefit of priority under 35 U.S.C. § 119 to U.S. Provisional Patent Application No. 63/185,551, filed May 7, 2021, and entitled "Methods and Apparatus for Vehicle Motion Mitigation During Side Impact," which is incorporated herein by reference in its entirety.

TECHNICAL FIELD

The disclosure relates generally to autonomous vehicles. More particularly, the disclosure relates to systems and method for enabling an autonomous vehicle to come to a rapid stop in the event of a side impact or an imminent impact.

BACKGROUND

As vehicles drive, autonomously or under the control of an operator or driver, there are many instances in which vehicles in motion need to stop as quickly as possible. For example, when a pedestrian crosses a roadway directly in a path of a vehicle, the vehicle generally must either take evasive measures or come to a fast stop to avoid striking the pedestrian. In many instances, it may not be possible for a vehicle to swerve or to stop fast enough to avoid a collision. In such instances, if the vehicle may come to a rapid stop before, during, or immediately after impact with one vehicle, further damage may be prevented, e.g., the vehicle may avoid colliding with another vehicle.

The ability to come to a rapid stop, or to decelerate rapidly, is crucial to allow vehicles to avoid collisions and/or to reduce the likelihood of causing damage due to an unavoidable collision. It is often also crucial for a stationary vehicle to maintain a stationary position in the event of an unavoidable collision to prevent the vehicle from becoming a part of a secondary collision, e.g., when a stationary vehicle is pushed into traffic due to an unavoidable collision caused by another vehicle colliding with the stationary vehicle. When a vehicle which is part of an unavoidable collision has a change in a direction or speed of travel because of an unavoidable collision, the vehicle may collide with another vehicle or object. Due to unbalanced force principles, e.g., principles associated with Newton's First Law of Motion, when a vehicle is affected by an outside or unbalanced force, the vehicle may move and potentially collide with another vehicle or object.

Known solutions which decelerate a vehicle include Torricelli brakes, air brakes, hydraulic brakes, and pneumatic brakes. Such brakes, while generally allowing vehicles to brake, are inadequate to provide rapid deceleration due to significant frictional forces that arise when the brakes are engaged.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
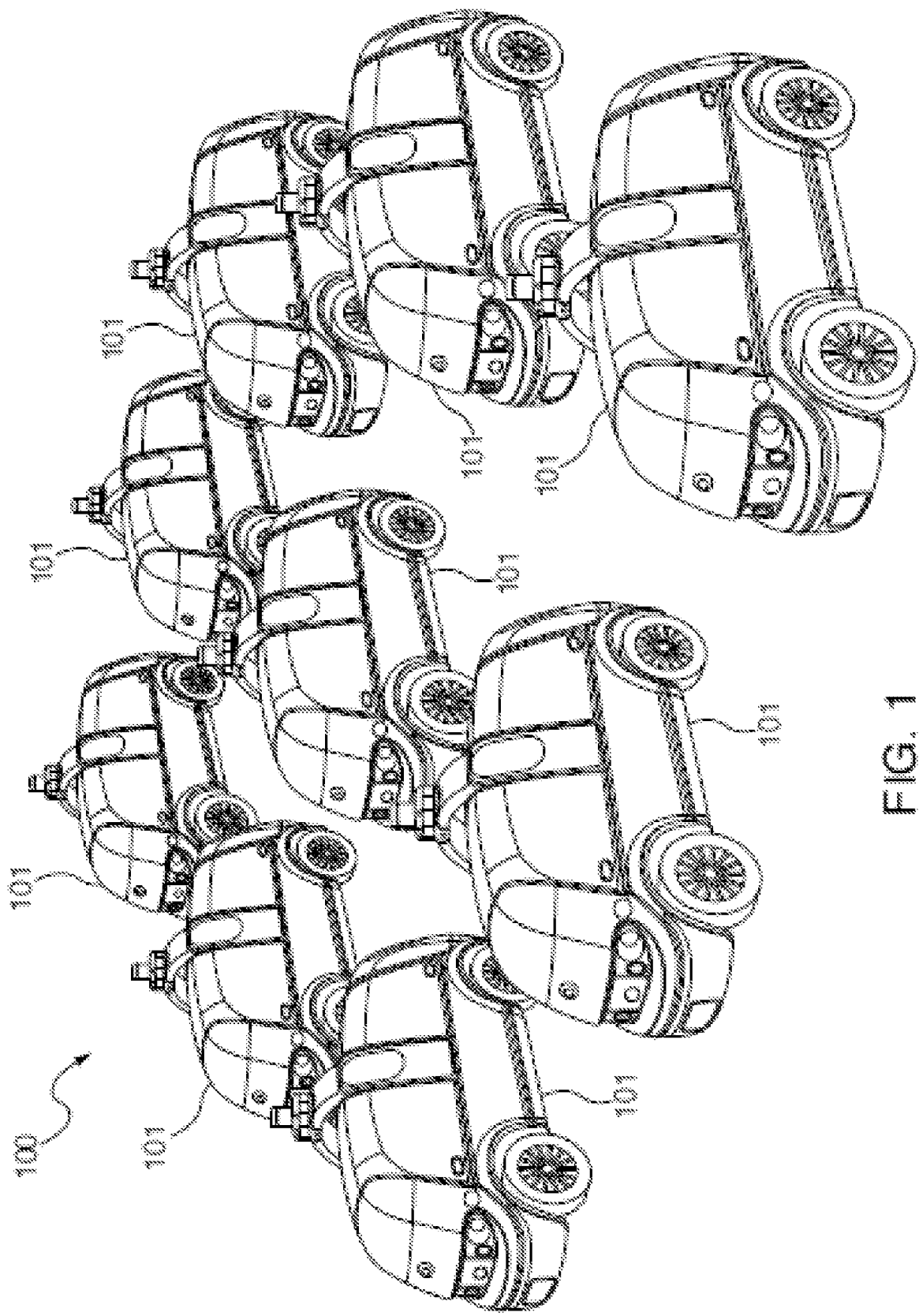
FIG. 1 is a diagrammatic representation of an autonomous vehicle fleet in accordance with an embodiment.

According to one aspect, a method includes identifying a condition relating to an impact on a vehicle by an object, the vehicle including at least one anchor mechanism, the at least one anchor mechanism configured to anchor the vehicle to a surface. The method also includes determining whether the condition indicates that the anchor mechanism is to be deployed, and deploying the anchor mechanism when it is determined that the condition indicates that the anchor mechanism is to be deployed. In one embodiment, the condition may relate to an actual impact on the vehicle or an imminent impact on the vehicle.

According to another aspect, a vehicle includes a chassis and a propulsion system carried on the chassis. The propulsion system is configured to enable the vehicle to move, wherein the propulsion system includes an anchor system, the anchor system including an anchor and being configured to deploy the anchor to anchor the vehicle to a surface in response to a condition. The condition is associated with an impact on the vehicle by an object.

According to still another aspect, a method includes identifying a condition relating to a severity of one selected from a group including an impact and an anticipated impact by an object on an autonomous vehicle while the autonomous vehicle is on a surface. The autonomous vehicle includes at least one anchor mechanism that is configured to deploy an anchor to anchor the autonomous vehicle to the surface. The method also includes determining whether the condition indicates that the anchor mechanism is to be deployed, and deploying the anchor mechanism when it is determined that the condition indicates that the anchor mechanism is to be deployed.

In one embodiment, an autonomous vehicle includes an anchor system or rapid deceleration mechanism that is configured to deployed to anchor the autonomous vehicle to a road surface in the event of an impact such as a side or rear impact on an autonomous vehicle, or in the event of a substantially imminent impact such as a side or rear impact with the autonomous vehicle. The anchor system may be triggered to deploy one or more anchors once a side impact occurs or is substantially imminent to prevent translational motion of the autonomous vehicle. By substantially minimizing or preventing translational movement of the autonomous vehicle due to a side impact collision or an imminent collision, the likelihood that the autonomous vehicle may come into contact with another object such as another vehicle may be reduced.

Description

While braking systems on a vehicle such as an autonomous vehicle may serve to provide adequate deceleration and braking in most situations, some situations may arise in which rapid deceleration that may not be accomplished using braking systems may be needed. For example, if an autonomous vehicle is travelling or driving on a roadway with other vehicles and a vehicle impacts the side of the autonomous vehicle, the use of braking systems may not be adequate to prevent the autonomous vehicle from colliding with another vehicle. In addition, if a vehicle collides with a stopped or otherwise substantially stationary autonomous vehicle, the use of a braking system may be inadequate to prevent the autonomous vehicle from colliding with another vehicle.

By providing a rapid deceleration system or mechanism for use when a braking system on a vehicle is expected to be or is likely to be inadequate to prevent the vehicle from being a part of one or more collisions, the chances of averting a collision may be increased as vehicle motion is mitigated. Such a rapid deceleration system may be arranged as a "last chance" braking system that may be activated to cause the vehicle to come to a stop when conditions indicate that a primary braking system may be insufficient. Such conditions may include, but are not limited to including, a speed at which the vehicle is travelling, a current distance between the vehicle and an anticipated location of a collision with an obstacle, and/or a speed at which an obstacle is travelling.

A rapid deceleration system or mechanism may be used in the event of a collision to prevent further damage. When an autonomous vehicle is subjected to an impact such as a side impact, as for example when a vehicle collides with a side of the autonomous vehicle, the ability for the autonomous vehicle to rapidly decelerate to a stop may prevent the autonomous vehicle from colliding with another vehicle. In other words, a rapid deceleration system may be deployed when an autonomous vehicle is subjected to a side impact collision in order to prevent the autonomous vehicle from drifting into the path of another vehicle and/or from colliding with another vehicle as a result of the forces generated during the side impact collision.

In one embodiment, if an autonomous vehicle detects or senses that a side impact collision has occurred or is substantially imminent, a rapid deceleration system may be activated or engaged. The rapid deceleration system may, when activated, effectively anchor the autonomous vehicle to a surface on which the vehicle is travelling. The rapid deceleration system may be arranged to alter, e.g., damage, a surface on which the vehicle is travelling in order to substantially ensure that a further collision may be avoided.

In another embodiment, if an autonomous vehicle detects or otherwise determines that another vehicle is likely to collide with the autonomous vehicle substantially imminently, the autonomous vehicle may activate or engage a rapid decelerations. The collision caused by the other vehicle may be any collision, as for example a side impact collision or a collision in which the other vehicle effectively rear ends the autonomous vehicle. The rapid deceleration system may be activated to substantially anchor the autonomous vehicle to a road surface to reduce movement of the autonomous vehicle once the other vehicle makes impact with the autonomous vehicle. By anchoring the autonomous vehicle prior to impact, the autonomous vehicle may avoid a secondary or further collision.

A system for rapidly decelerating a vehicle may include at least one powered driver and at least one anchor supported by the powered driver. The powered driver may be arranged to be to be movably coupled to a frame or a chassis of the vehicle. The powered driver may also be configured to propel the anchor from the powered driver into a road surface to both secure the vehicle to the road surface and to absorb energy through substantially deforming the anchor and the vehicle chassis or frame. The use of a powered driver to effectively drive or force an anchor into a surface such as a road surface allows a vehicle to decelerate. In one embodiment, a rapid deceleration mechanism may include two modules positioned near rear tires of a vehicle and coupled to a vehicle frame. Each module may include a powered driver and an anchor.

Many autonomous vehicles operate as part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
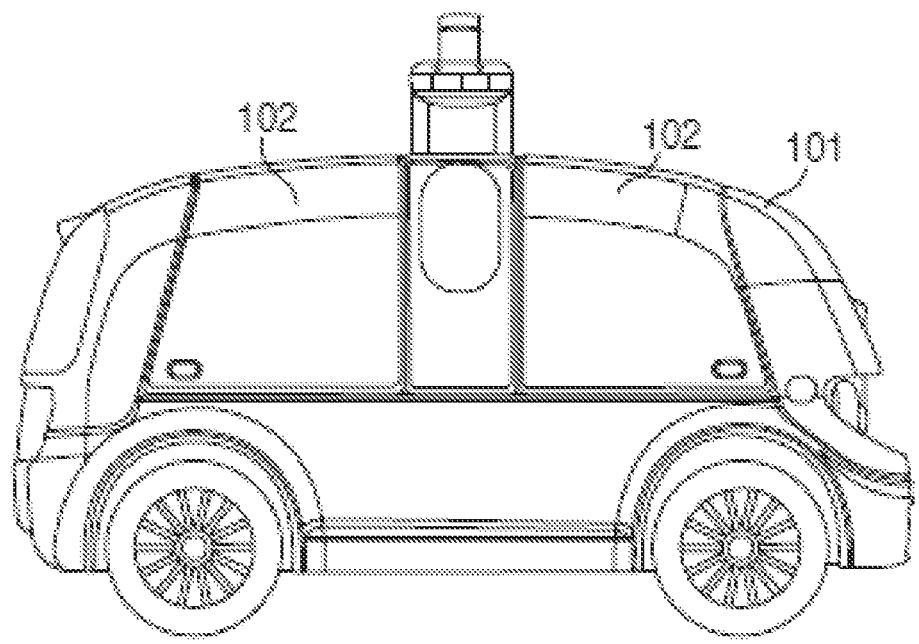
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
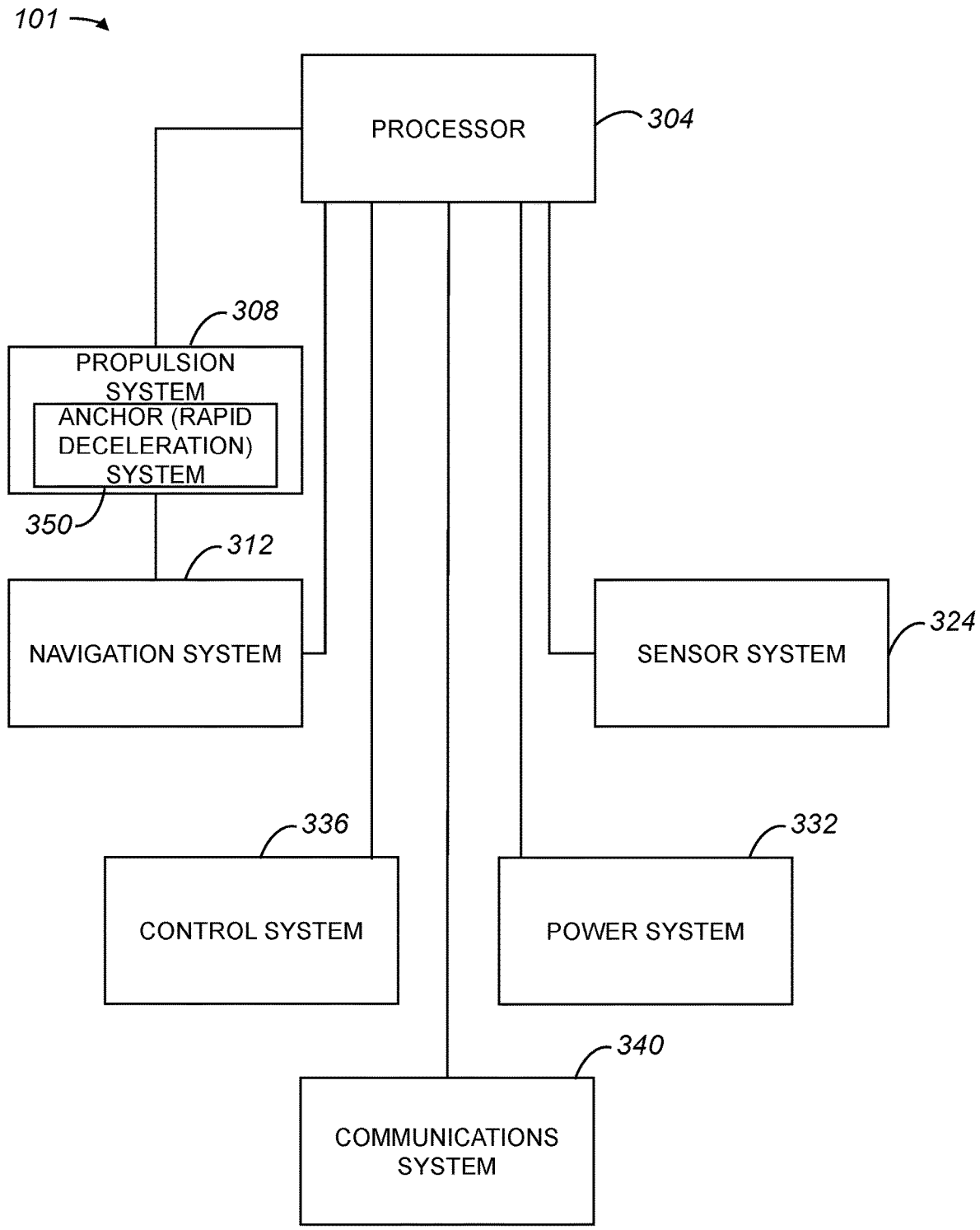
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

In one embodiment, propulsion system 308 includes an anchor system or a rapid deceleration system 350. Anchor system 350 that may be configured to facilitate the rapid deceleration of vehicle 101, e.g., when braking systems are not sufficient to cause vehicle 101 to rapidly decelerate. Anchor system 350 may also be configured to facilitate rapid deceleration in the event that vehicle 101 suffers a collision, e.g., a side impact collision, to substantially prevent vehicle 101 from travelling off of an intended path and into the path of another vehicle. That is, anchor system 350 may be substantially triggered to reduce the likelihood that vehicle 101, after a side impact collision, travels and becomes part of another collision. Anchor system 350 will be discussed below with respect to FIG. 4.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101. Sensor system 324 may include sensors such as collision sensors that may determine when autonomous vehicle 101 is involved in a collision or when a collision may be imminent or is otherwise anticipated. By way of example, sensor system 324 may include, but is not limited to including, an inertial measurement unit (IMU), an accelerometer and/or a micro electro-mechanical systems (MEMS) sensor or device which may be used to identify an impact or a substantially imminent impact with a side of autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

The ability to rapidly decelerate a vehicle such as autonomous vehicle 101 enhances the ability of the vehicle to operate safely by increasing the likelihood that the vehicle may avoid collisions, e.g., by rapidly slowing to a stop in a relatively fast manner, and/or to increase the likelihood that in the event of a side impact, autonomous vehicle 101 may avoid being part of another impact. When it is determined that a primary or "normal" braking system is unlikely to be sufficient to avoid an obstacle located along an immediate path a vehicle, a secondary or "emergency" deceleration system may be activated. Such a deceleration system may be arranged to rapidly decelerate by deploying a mechanism that cuts into a surface, e.g., a pavement or a surface of a roadway, to effectively anchor the vehicle to the surface such that further traveling of the vehicle may be substantially prevented.

In one embodiment, anchor system 350 includes one or more anchors which are supported by a housing mounted on a bottom side of autonomous vehicle 101. A housing may be mounted on bottom surface of a chassis of autonomous vehicle 101 such that one or more anchors may be deployed into a surface such as a road surface. The one or more anchors may be arranged to be deployed such that, when deployed, the one or more anchors are substantially outside of the vehicle, e.g., underneath the vehicle.

Figure 4:
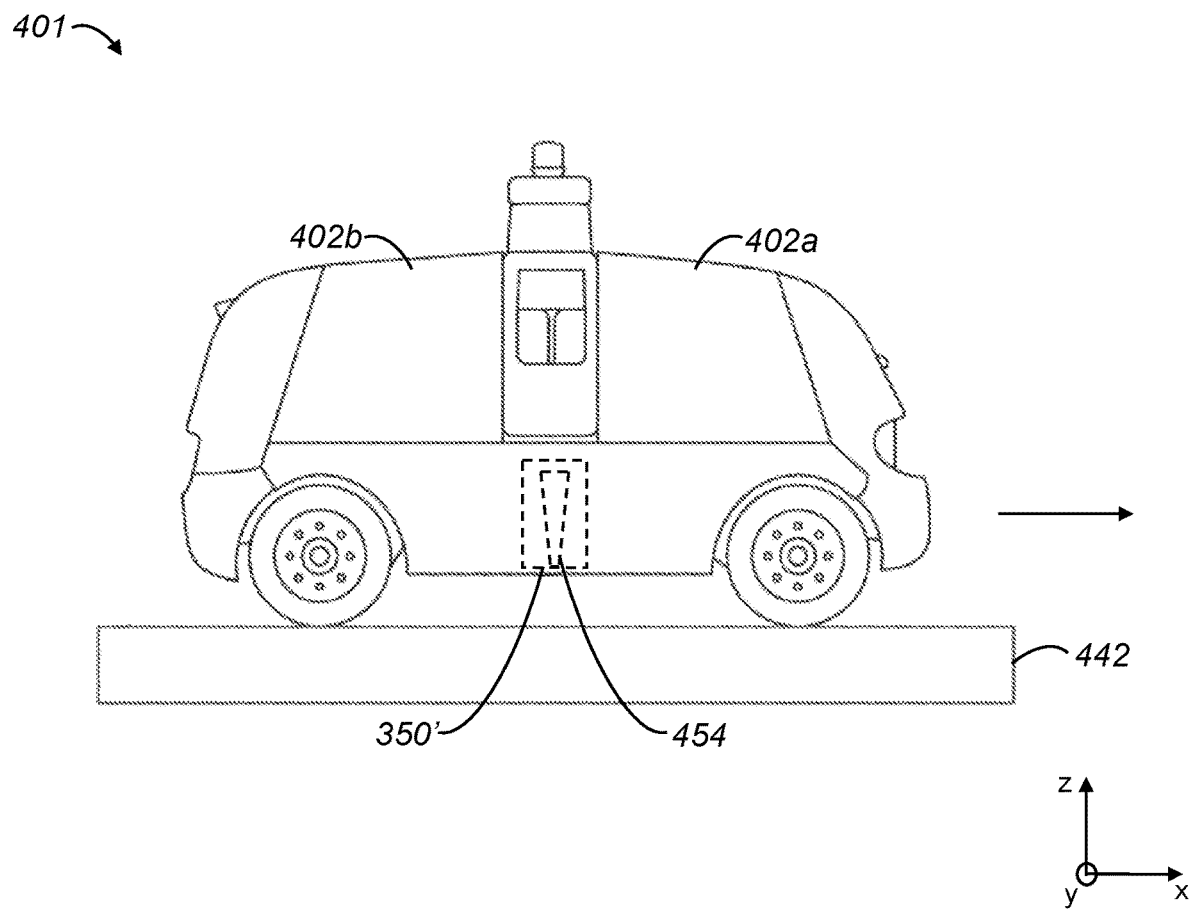
FIG. 4 is a diagrammatic representation of an autonomous vehicle which includes an anchor arrangement, e.g., anchor system 350 of FIG. 3, in accordance with an embodiment.

FIG. 4 is a diagrammatic representation of an autonomous vehicle which includes an anchor arrangement, e.g., anchor system 350 of FIG. 3, in accordance with an embodiment. An autonomous vehicle 401, which may include components and features of autonomous vehicle 101 of FIG. 3, is generally arranged to drive or be otherwise conveyed on a surface 442. Surface 442 may be a surface of a road, and may be a pavement surface such as concrete or asphalt.

Anchor system or rapid deceleration mechanism 350' is mounted on autonomous vehicle 401. As shown, anchor system 350' is mounted on or near a bottom side of autonomous vehicle 401 such that an anchor 454 is arranged to be carried on the bottom surface such that, when deployed, anchor 454 may deploy into surface 442. That is, anchor system 350' is positioned substantially over surface 442, and is arranged to allow autonomous vehicle 401 to rapidly decelerate when rapid deceleration mechanism 450' is deployed. For example, if autonomous vehicle 401 is travelling in a direction along an x-axis when anchor 454 is deployed, autonomous vehicle 401 may be decelerated or otherwise slowed as autonomous vehicle 401 travels in a direction along the x-axis. It should be appreciated that while one anchor 454 is shown, anchor system 350' may include more than one anchor 454.

When vehicle 401 is subjected to a side impact, as for example an impact with another object such as a vehicle which causes an impact force to be applied to a side of vehicle 401 along a y-axis, anchor 454 may be deployed into surface 442 to substantially anchor vehicle 401. Anchoring vehicle 401 may prevent vehicle 401 from deviating from a planned path after a side impact and, as a result, may substantially prevent vehicle 401 from colliding with another object such as a vehicle. Vehicle 401 may also be anchored when it is determined that a side impact is imminent, in order to substantially minimize movement of vehicle 401 once impact occurs.

Figure 5A:
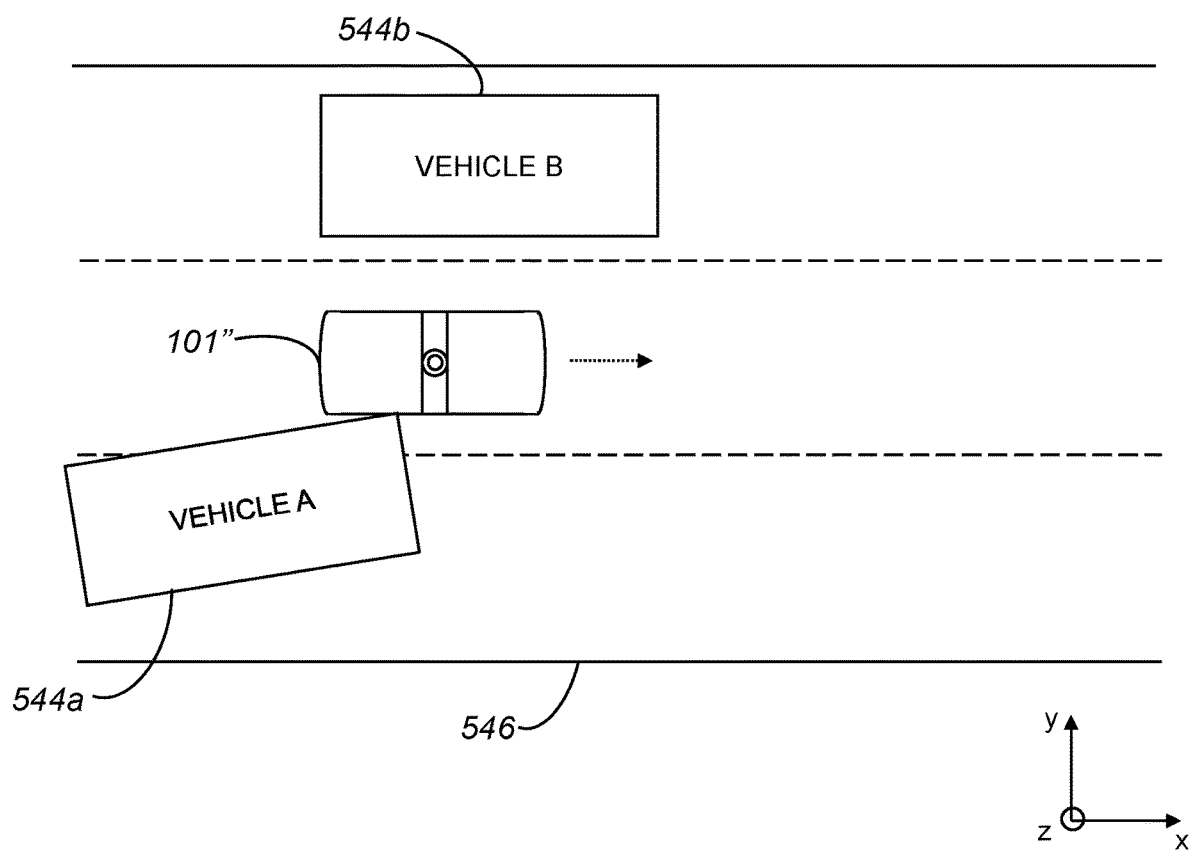
FIG. 5A is a diagrammatic representation of an autonomous vehicle, e.g., vehicle 101 of FIGS. 2 and 3, at a time t1 at which a first vehicle makes an impact with a side of the autonomous vehicle in accordance with an embodiment.

FIG. 5A is a diagrammatic top view representation of an autonomous vehicle, e.g., vehicle 101 of FIGS. 2 and 3, at a time t1 at which a first vehicle makes an impact with a side of the autonomous vehicle in accordance with an embodiment. Autonomous vehicle 101" is travelling on a roadway 546 along with first vehicle 544*a* and second vehicle 544*b* in a direction along an x-axis at a time t1, when first vehicle 544*a* makes physical contact with a side of autonomous vehicle 101" as autonomous vehicle 101" is travelling. In the described embodiment, the physical contact between first vehicle 544*a* and autonomous vehicle 101" includes a force being applied to a side of autonomous vehicle 101" in a direction at least along a y-axis.

After first vehicle 544*a* impacts a side of autonomous vehicle 101", a direction of movement of autonomous vehicle 101" may deviate from an original direction of travel or path, e.g., autonomous vehicle 101" may begin to travel in a direction that that includes components along both the x-axis and the y-axis. As such, autonomous vehicle 101" deploys at least one anchor or rapid deceleration mechanism at a time t2 to effectively anchor autonomous vehicle 101" to a surface of roadway 546. Anchoring autonomous vehicle 101" to a surface of roadway 546 may reduce the likelihood that autonomous vehicle 101" may make physical contact with vehicle 544b.

Figure 5B:
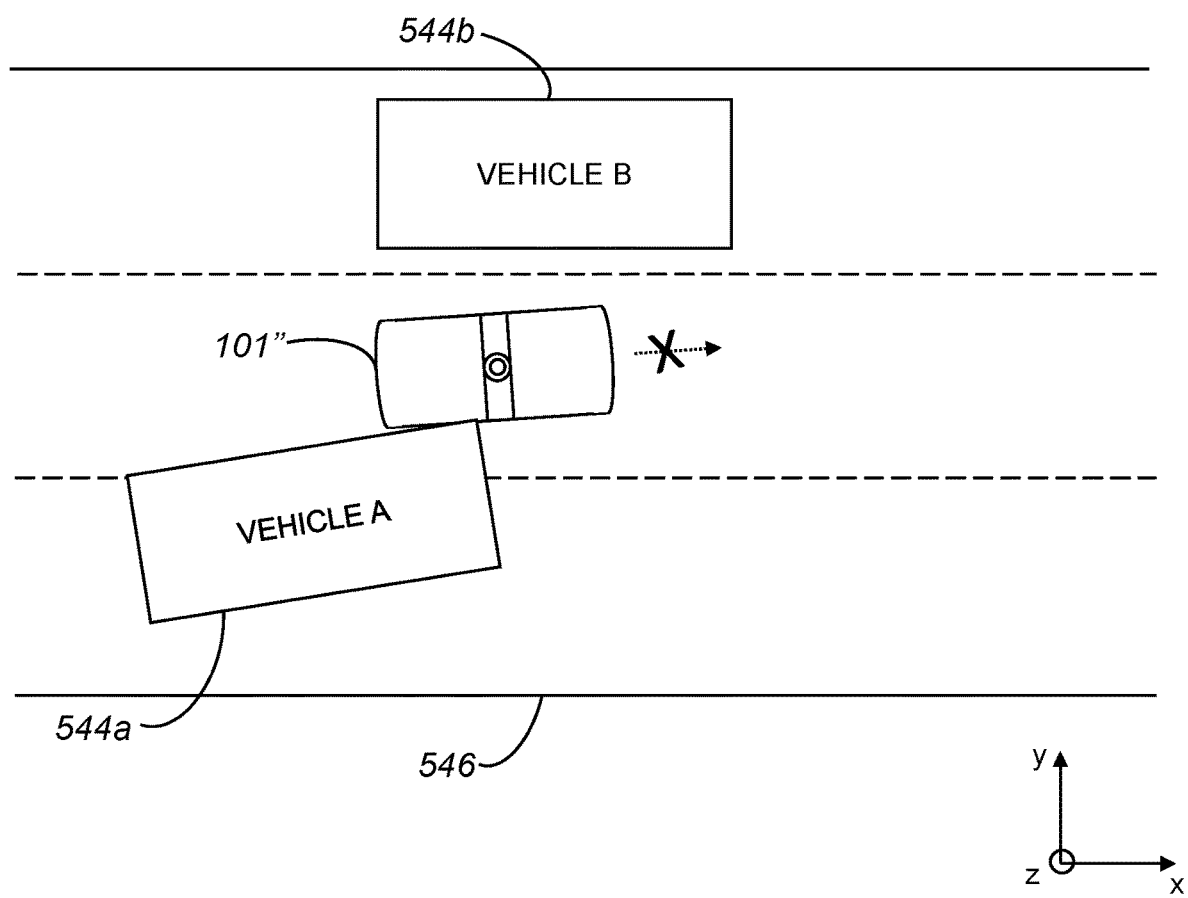
FIG. 5B is a diagrammatic representation of an autonomous vehicle, e.g., vehicle 101" of FIG. 5A, at a time t2 at which at which the autonomous vehicle deploys an anchor after impact in accordance with an embodiment.

As shown in FIG. 5B, at a time t2, autonomous vehicle 101" is stopped. While vehicle 544a has impacted or collided with autonomous vehicle 101", autonomous vehicle 101" has not impacted vehicle 544b. The anchoring of autonomous vehicle 101" to a surface of roadway 546 effectively enables forces associated with the impact with first vehicle 544a to be prevented from being transmitted to and/or absorbed by vehicle 544b.

An anchor system, e.g., anchor system 350 of FIG. 3, may vary widely. For example, an anchor system may include substantially dedicated sensors which facilitate the deployment of an anchor and/or an anchor system may utilize sensors associated with other systems on an autonomous vehicle.

Figure 6:
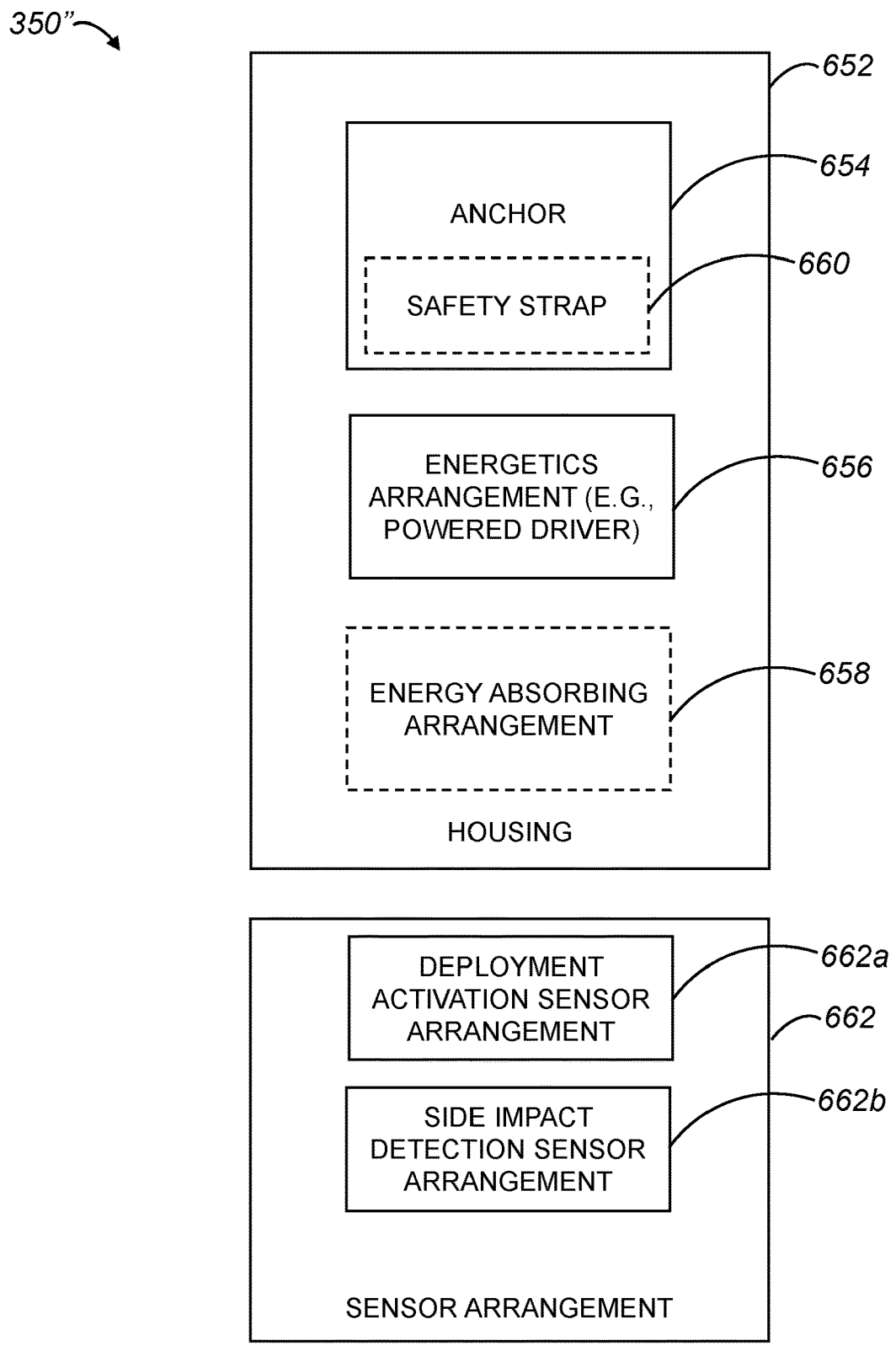
FIG. 6 is a block diagram representation of an anchor system, e.g., anchor system 350 of FIG. 3, in accordance with an embodiment.

FIG. 6 is a block diagram representation of an anchor system, e.g., anchor system 350 of FIG. 3, which includes substantially dedicated sensors in accordance with an embodiment. Anchor system or rapid deceleration system 350" includes a housing 652 configured to be positioned on a vehicle such as vehicle 401 of FIG. 4. Housing 652 includes at least one anchor 654, an energetics arrangement such as a powered driver 656, and an optional energy absorbing arrangement 658. Anchor system 350" also includes a sensor arrangement 662.

Anchor 654 is configured to be deployed by energetics arrangement 656. When deployed, anchor 654 effectively cuts into a surface on which a vehicle such as vehicle 401 of FIG. 4 is travelling or driving. The configuration of anchor 654 may vary widely. For example, the shape and size of anchor 654 may vary, and anchor 654 may be formed from any suitable material such as forged steel. One suitable shape for anchor 654 a conical, tapered shape, e.g., a shape that includes a substantially pointed end configured to facilitate anchoring anchor 654 into a road surface.

Anchor 654 may include an optional safety strap or lanyard 660. Optional safety strap 660 may be attached to anchors 654 using a mechanism such as a D-ring, and may effectively attach anchor 654 to a vehicle such as vehicle 401 of FIG. 4, as for example to a frame of a vehicle, when anchor 654 is deployed.

Energetics arrangement 656 may be an actuating mechanism or a powered driver, and may be configured to cause anchor 654 to be deployed. Such deployment may include using energetics arrangement 656 to effectively propel anchor 654 towards a road surface to cut into the road surface. Energetics arrangement 656 may include, but is not limited to including, a pyrotechnic telescoping devices or other mechanism which may be selectively activated to cause anchor 654 to be propelled toward a road surface.

Optional energy absorbing arrangement 658 is arranged to dissipate energy, e.g., kinetic energy, which is generated when anchor 654 is deployed to stop a vehicle such vehicle 401 of FIG. 4. Optional energy absorbing arrangement 658 may be any suitable device including, but are not limited to including, hydraulic shocks, disc brakes, and/or structures that are designed to substantially crumple under shock loads. In one embodiment, when a vehicle frame is arranged to absorb energy associated with the deployment of anchor 654, energy absorbing arrangement 658 may not be included in anchor system 350". It should be appreciated, however, that even if a vehicle frame is arranged to absorb energy associated with the deployment of anchor 654, energy absorbing arrangement 658 may be included in anchor system 350". In one embodiment, energy absorbing arrangement 658 may be associated with energetics arrangement 656, as will be discussed below with reference to FIG. 10.

Sensor arrangement 662 generally includes sensors used to facilitate the deployment of anchor 654 using energetics arrangement 656. Sensor arrangement 662 includes a deployment activation sensor arrangement 662a and a side impact detection sensor arrangement 662b. Deployment activation sensor arrangement 662a includes one or more sensors configured to obtain and to provide information to energetics arrangement 656 to effectively cause energetics arrangement 656 to trigger. Side impact detection sensor arrangement 662b includes one or more sensors configured to obtain information relating to whether a vehicle such as vehicle 401 of FIG. 4 has been physically contacted or impacted, e.g., on one side. Sensors included in side impact detection sensor arrangement 662b may include, but are not limited to including, collision sensors, accelerometers, cameras, and/or MEMS sensors. Sensors included in side impact sensor arrangement 662b may be configured to detect a side impact, to detect a substantially imminent or anticipated side impact, to determine a force associated with a side impact, and/or to determine the direction and magnitude of a force vector associated with a side impact.

Figure 7:
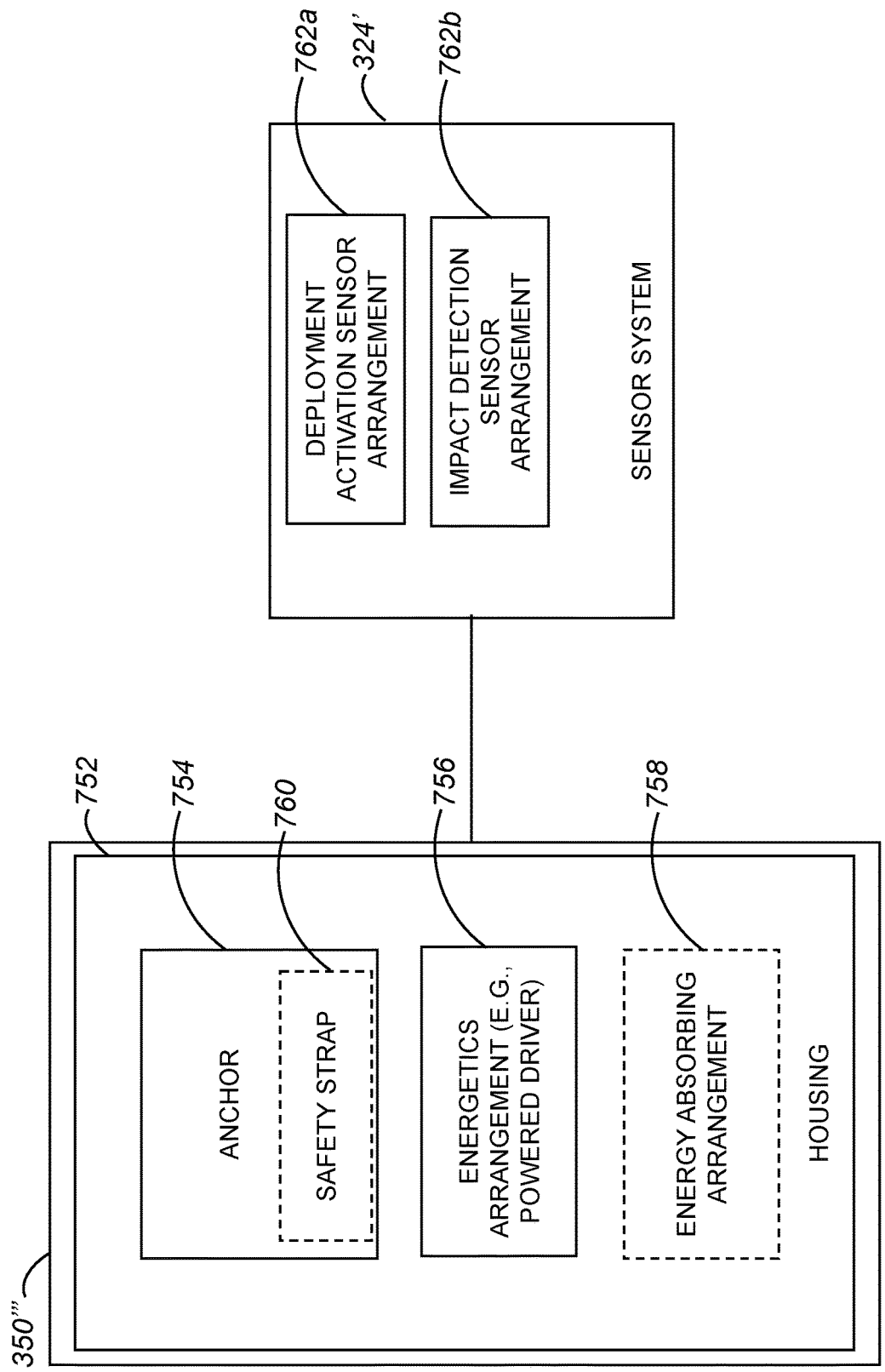
FIG. 7 is a block diagram representation of an anchor system, e.g., anchor system 350 of FIG. 3, which cooperates with sensors included in a sensor system, e.g., sensor system 324 of FIG. 3, in accordance with an embodiment.

In one embodiment, sensors used to support the deployment of an anchor of an autonomous vehicle in response to a side impact collision or a substantially imminent impact collision, side impact or otherwise, may be part of an overall sensor system of the autonomous vehicle. That is, sensors used to support the deployment of an anchor may be part of other systems. With reference to FIG. 7, an anchor system, e.g., anchor system 350 of FIG. 3, which cooperates with sensors included in a sensor system, e.g., sensor system 324 of FIG. 3, will be described in accordance with an embodiment. Anchor system 350''' includes a housing 752 which supports or otherwise contains an anchor 754, and energetics arrangement 756, and an optional energy absorbing arrangement 758. Anchor 754 may have an optional safety strap 760.

Figure 8:
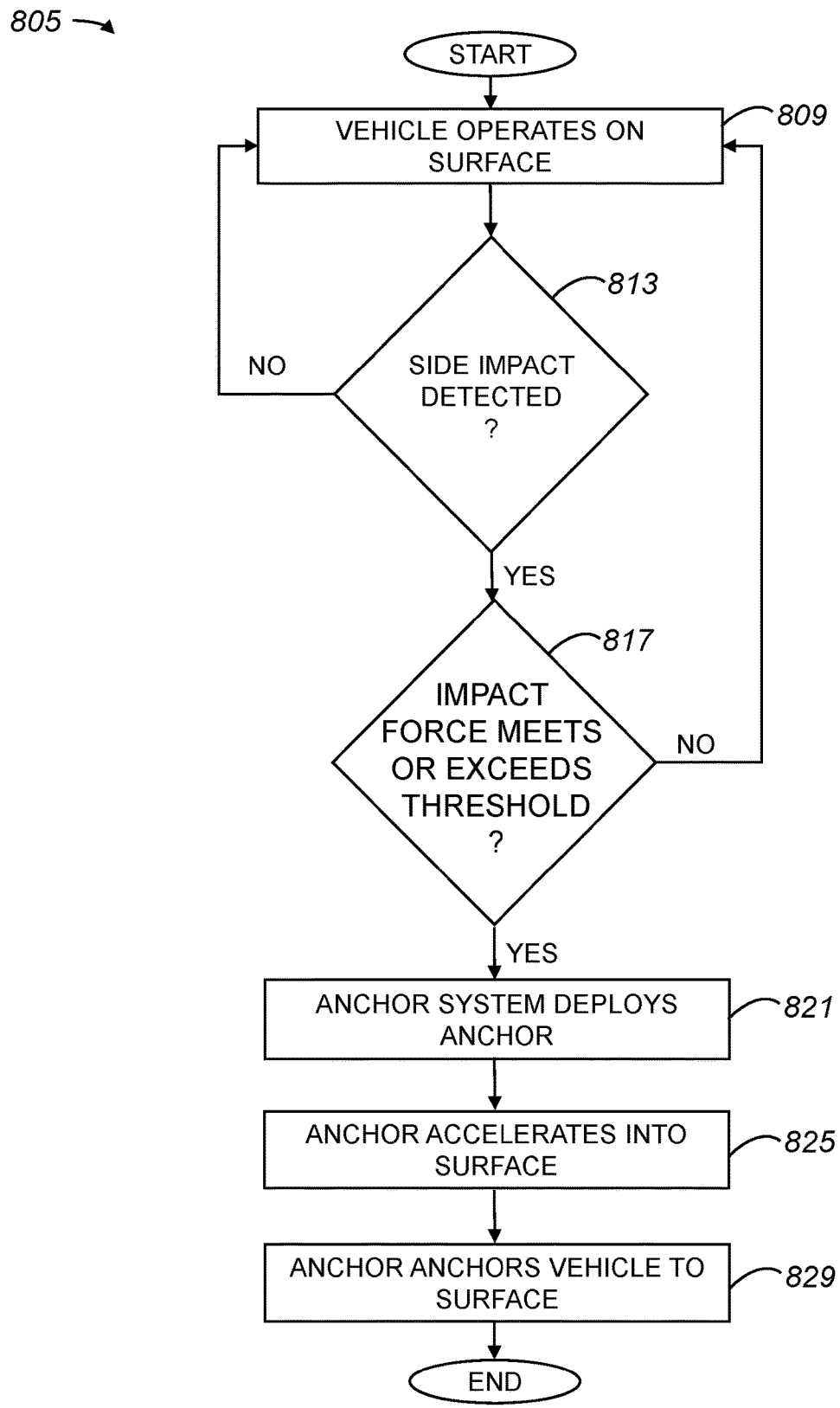
FIG. 8 is a process flow diagram which illustrates a method of stopping an autonomous vehicle which is configured to deploy an anchor in the event of a side impact in accordance with an embodiment.

Anchor system 350''' is communicably coupled to sensor system 324'. Sensor system 324' that generally includes sensors which facilitate the operation of various systems on an autonomous vehicle. That is, sensor system 324' is not limited to including sensors used to facilitate the deployment of anchor 754 when an impact such as a side impact is detected or is determined to be substantially imminent. Sensor system 324' generally includes a deployment activation sensor arrangement 762a and an impact detection sensor arrangement 762b. Deployment activation sensor arrangement 762a includes one or more sensors configured to obtain and to provide information to energetics arrangement 756 to effectively cause energetics arrangement 756 to trigger. Impact detection sensor arrangement 762b includes one or more sensors configured to obtain information relating to whether a vehicle such as vehicle 401 of FIG. 4 has been physically contacted or impacted, e.g., on one side, by an object such as another vehicle and/or whether contact by the object with the vehicle is substantially imminent. Impact detection sensor arrangement 762b may include sensors which are configured to detect an actual collisions including, but not limited to including, accelerometers and inertial measurement units (IMUs). Additionally, or alternatively, impact detection sensor arrangement 762b may include sensors configured to identify a substantially imminent collision prior to a collision occurring including, but not limited to including, radar sensors, ultrasonic sensors, and frequency modulated continuous wave (FMCW) lidar sensors, FIG. 8 is a process flow diagram which illustrates a method of stopping an autonomous vehicle which is configured to deploy an anchor in the event of a side impact in accordance with an embodiment. A method 805 of stopping an autonomous vehicle which is configured to deploy an anchor in the event of a side impact or a substantially imminent side impact begins at a step 809 in which an autonomous vehicle operates on a surface, e.g., a surface of a road. As the vehicle operates, the vehicle may travel or drive on the road.

In a step 813, a determination is made as to whether a side impact is detected. Such a determination may generally include determining whether sensors on the vehicle have determined that a side impact has occurred or is otherwise about to occur. If a side impact is not detected, then the vehicle continues to operate on the surface in step 809.

Alternatively, if it is determined in step 813 that a side impact is detected, then process flow proceeds to a step 817 in which it is determined whether the impact force associated with the side impact meets or exceeds a threshold. The threshold may an amount of force above which deployment of an anchor is considered to be warranted. If the determination in step 817 is that the impact force does not meet or exceed the threshold, then the vehicle continues to operate on the surface in step 809.

If, however, the impact force is determined to meet or exceed the threshold in step 817, the implication is that the impact force is sufficient enough to cause significant translational movement of the vehicle off of its intended path. That is, the indication is that the impact force is likely to be large enough to cause the vehicle to make physical contact with an object such as another vehicle. As such, if the impact force is determined to meet or exceed the threshold, then the anchor system deploys the anchor in a step 821.

In a step 825, the deployed anchor is accelerated into the surface of the road on which the vehicle is travelling. A sharp tip of the anchor may puncture or otherwise break into the surface of the road. Then, in a step 829, the deployed anchor effectively anchors the vehicle to the surface of the road, and the method of stopping an autonomous vehicle is completed.

Figure 9:
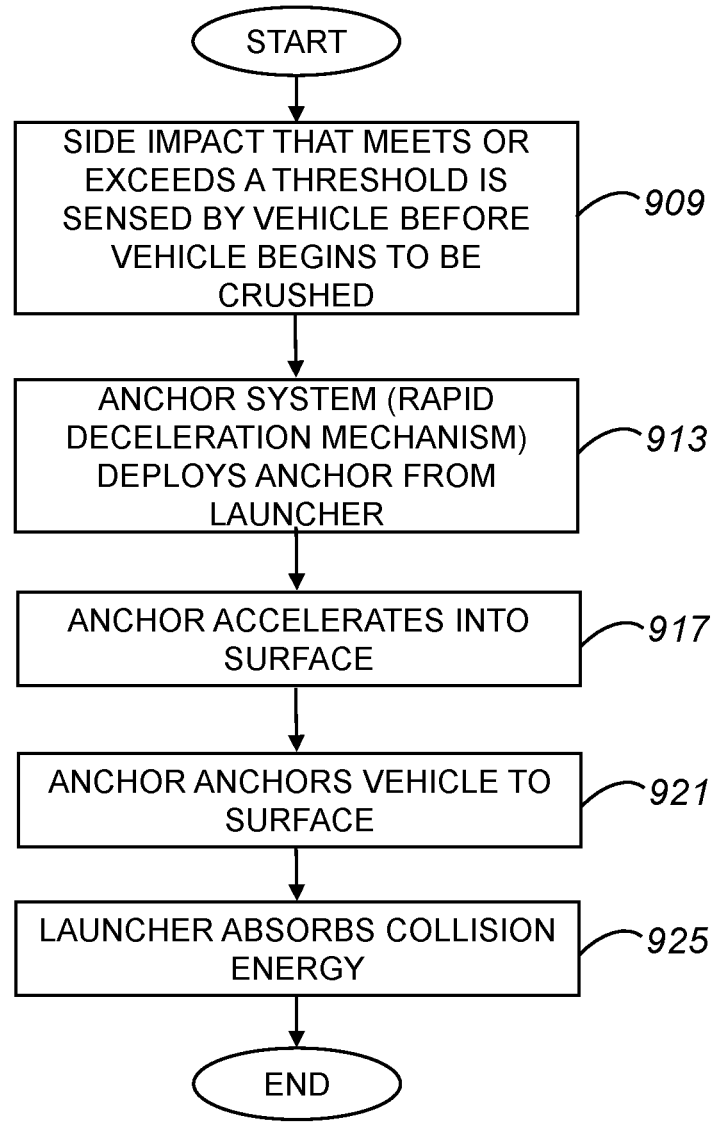
FIG. 9 is a process flow diagram which illustrates a method of utilizing an anchor in which a launcher absorbs energy in accordance with an embodiment.

In one embodiment, an anchor system may include a launcher which supports an anchor prior to deployment and which, upon deployment of the anchor, may absorb some impact force or energy, e.g., by becoming crushed or crumpled. FIG. 9 is a process flow diagram which illustrates a method of utilizing an anchor in which a launcher absorbs energy in accordance with an embodiment. A method 905 of utilizing an anchor system which includes a launcher begins at a step 909 in which a side impact that meets or exceeds a threshold, e.g., a threshold above which an anchor is to be deployed, is sensed by an autonomous vehicle before the autonomous vehicle begins to be crushed. That is, the autonomous vehicle senses an impact or a substantially imminent impact before the autonomous vehicle sustains or begins to sustain significant physical damage.

Once a side impact that meets or exceeds a threshold is sensed, an anchor system or rapid deceleration mechanism deploys an anchor from a launcher in a step 913. The anchor may be held by or within an opening in the launcher before the anchor is deployed, and the anchor may be deployed from within the launcher. Deploying the anchor causes the anchor to accelerate into a surface such as a road surface in a step 917. In a step 921, the anchor anchors the vehicle into the surface.

Upon the anchor anchoring the vehicle to the surface, the launcher absorbs collision energy in a step 925. The launcher may absorb collision energy through deformation. For example, if the launcher includes a hollow cylinder or a cylindrical tube, the launcher may absorb forces or energy by becoming crushed, crumpled, and/or flattened. That is, after the anchor is deployed or fired, the launcher may effectively be hollow tube which may absorb impact energy by crushing, thereby absorbing impact energy and substantially minimizing the elastic energy that may otherwise cause translational motion of the vehicle. After the launcher absorbs collision energy, the method of utilizing an anchor system which includes a launcher is completed.

Figure 10:
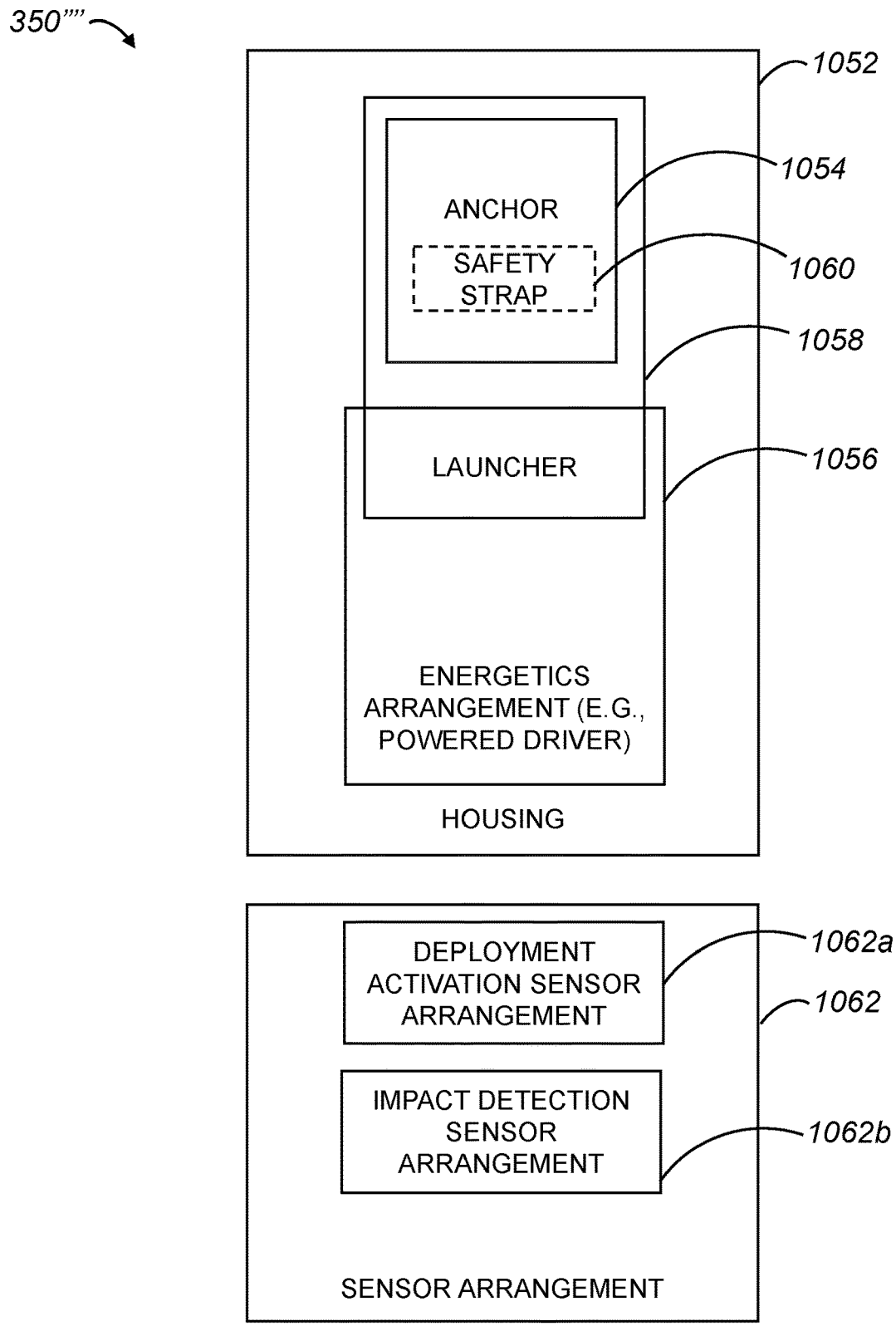
FIG. 10 is a block diagram representation of an anchor system, e.g., anchor system 350 of FIG. 3, in which a launcher may be an energy absorbing arrangement in accordance with an embodiment.

FIG. 10 is a block diagram representation of an anchor system, e.g., anchor system 350 of FIG. 3, in which a launcher may be an energy absorbing arrangement in accordance with an embodiment. Anchor system 350"" includes a housing 1052 configured to be positioned on a vehicle such as vehicle 401 of FIG. 4. Housing 1052 includes at least one anchor 1054, an energetics arrangement such as a powered driver 1056, and a launcher 1058. Anchor system 350"" also includes a sensor arrangement 1062. It should be appreciated that in lieu of including sensor arrangement 1062, anchor system 350"" may utilize sensors which are associated with other systems within a vehicle.

Anchor 1054 is supported within launcher 1058, and launcher 1058 may be configured to cooperate with energetics arrangement 1056 to deploy anchor 1054. In one embodiment, launcher 1058 may include a cylindrical tube within which anchor 1054 is supported pre-deployment. When deployed, anchor 1054 effectively cuts into a surface on which a vehicle such as vehicle 401 of FIG. 4 is travelling or driving. After deploying anchor 1054, launcher 1058 may include a cylindrical tube with a hollow, empty center or opening. Anchor 1054 may include an optional safety strap or lanyard 1060.

Energetics arrangement 1056 may be an actuating mechanism or a powered driver, and may be configured to cooperate with launcher 1058 to cause anchor 1054 to be deployed or otherwise launched. Such deployment or launching may include using energetics arrangement 1056 to effectively propel anchor 1054 out of and/or away from launcher 1058 towards a road surface to cut into the road surface. Energetics arrangement 1056 may include, but is not limited to including, a pyrotechnic telescoping devices or other mechanism which may be selectively activated to cause launcher 1058 to propel anchor 1054 toward a road surface.

In one embodiment, launcher 1058 is arranged to dissipate energy, as for example energy associated with a side impact collision. Launcher 1058 may deform, e.g., become crumpled or crushed, to absorb energy. It should be appreciated that launcher 1058 may be one of many energy absorbing arrangements associated with anchor system 350"".

Sensor arrangement 1062 may includes sensors used to facilitate the deployment of anchor 1054 using launcher 1058 in cooperation with energetics arrangement 1056. Sensor arrangement 1062 includes a deployment activation sensor arrangement 1062a and an impact detection sensor arrangement 1062b.

As mentioned above, one or more anchors of a rapid deceleration mechanism of a vehicle such as an autonomous vehicle may be deployed in advance of an impact such as a side impact or a rear impact. When an anchor of an autonomous vehicle is deployed prior to another vehicle making impact with the autonomous vehicle, the autonomous vehicle may be substantially prevented from moving or significantly moving once an impact occurs. In some situations, when a vehicle detects a condition such as an actual impact with the vehicle, the vehicle may deploy at least one anchor. In other situations, when a vehicle detects a substantially imminent impact, the vehicle may deploy at least one anchor.

Figure 11A:
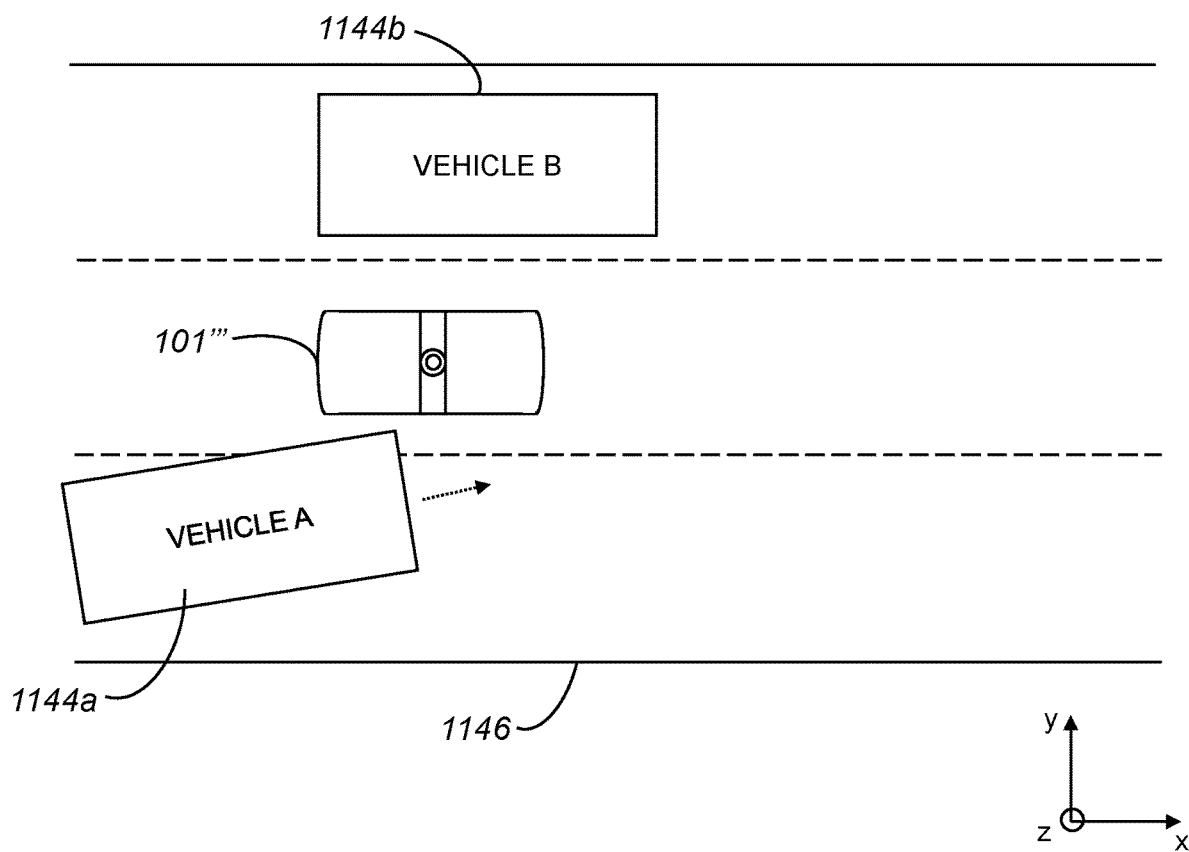
FIG. 11A is a diagrammatic representation of an autonomous vehicle, e.g., vehicle 101 of FIGS. 2 and 3, at a time t1 at which the autonomous vehicle deploys an anchor after the first vehicle is identified as about to make impact with a side of the autonomous vehicle in accordance with an embodiment.
Figure 11B:
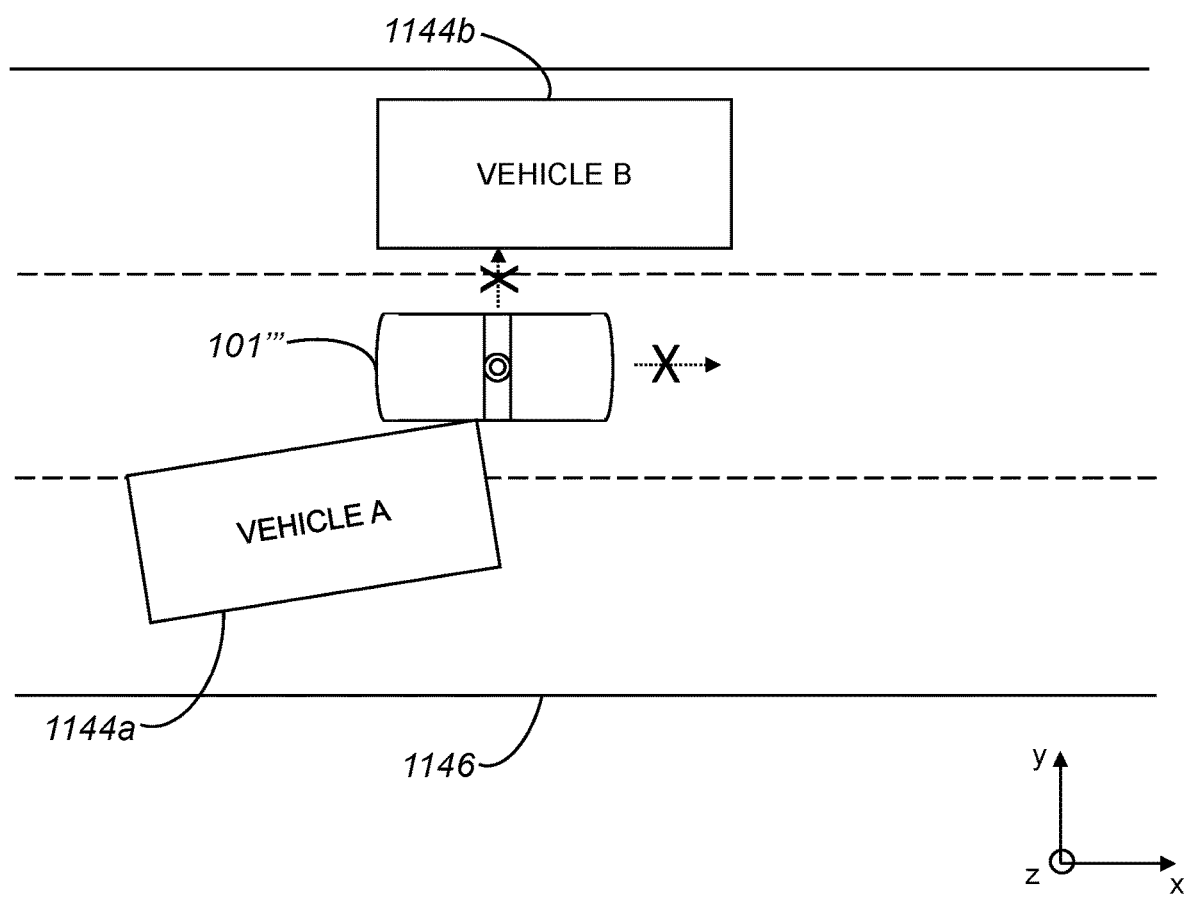
FIG. 11B is a diagrammatic representation of an autonomous vehicle, e.g., vehicle 101''' of FIG. 11A, at a time t2 after impact in accordance with an embodiment.

Referring next to FIGS. 11A and 11B, the deployment of one or more anchors prior to a side impact on an autonomous vehicle will be described in accordance with an embodiment. FIG. 11A is a diagrammatic representation of an autonomous vehicle, e.g., vehicle 101 of FIGS. 2 and 3, at a time t1 at which the autonomous vehicle deploys an anchor after the first vehicle is identified as about to make impact with a side of the autonomous vehicle in accordance with an embodiment. At a time t1, autonomous vehicle 101''' is substantially stationary on a surface such as a surface of a road 1146. For example, vehicle 101''' may be stopped in traffic or stopped at an intersection.

A first vehicle 1144a is on a trajectory which places vehicle 101''' in the path of first vehicle 1144a such that first vehicle 1144a will impact, collide with, and/or otherwise make contact with vehicle 101'''. A second vehicle 1144b is in a position in the vicinity of vehicle 101''' such that when first vehicle 1144a impacts vehicle 101''', vehicle 101''' is likely to make contact with second vehicle 1144b if vehicle 101''' is not anchored to a surface of road 1146. That is, a primary collision between first vehicle 1144a and vehicle 101''' is generally anticipated to cause a secondary collision between vehicle 101''' and second vehicle 1144b if vehicle 101''' is not anchored to a surface of road 1146. It should be appreciated that second vehicle 1144b may either be moving or substantially stationary.

Vehicle 101''' determines, at time t1, that a collision between first vehicle 1144a and vehicle 101''' is essentially imminent. As such, vehicle 101''' deploys one or more anchors that effectively anchor vehicle 101''' to a surface of road 1146.

At a time t2, as shown in FIG. 11B, first vehicle 1144a contacts vehicle 101'''. As vehicle 101''' is anchored to a surface of road 1146, vehicle 101''' does not move significantly in any direction as a result of contact caused by first vehicle 1144a. For example, vehicle 101''' does not cause a secondary collision with second vehicle 1144b when first vehicle 1144a causes a primary collision with vehicle 101'''.

Figure 12A:
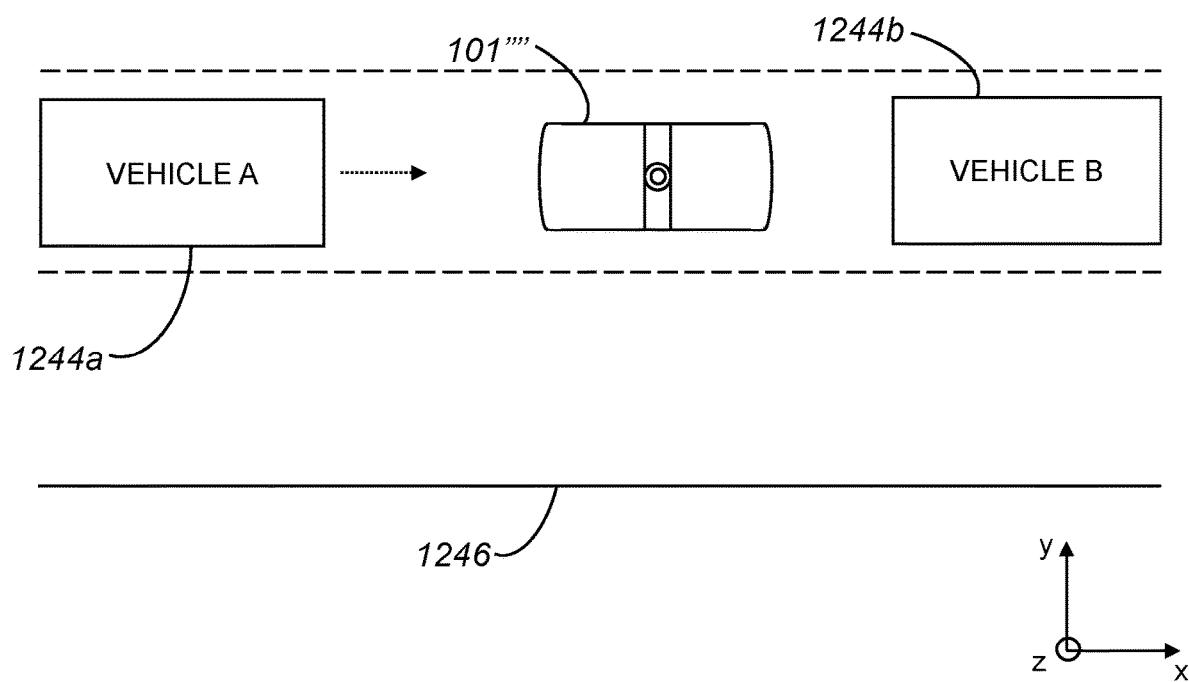
FIG. 12A is a diagrammatic representation of an autonomous vehicle, e.g., vehicle 101 of FIGS. 2 and 3, at a time t1 at which the autonomous vehicle deploys an anchor after the first vehicle is identified as about to make impact with a rear of the autonomous vehicle in accordance with an embodiment.
Figure 12B:
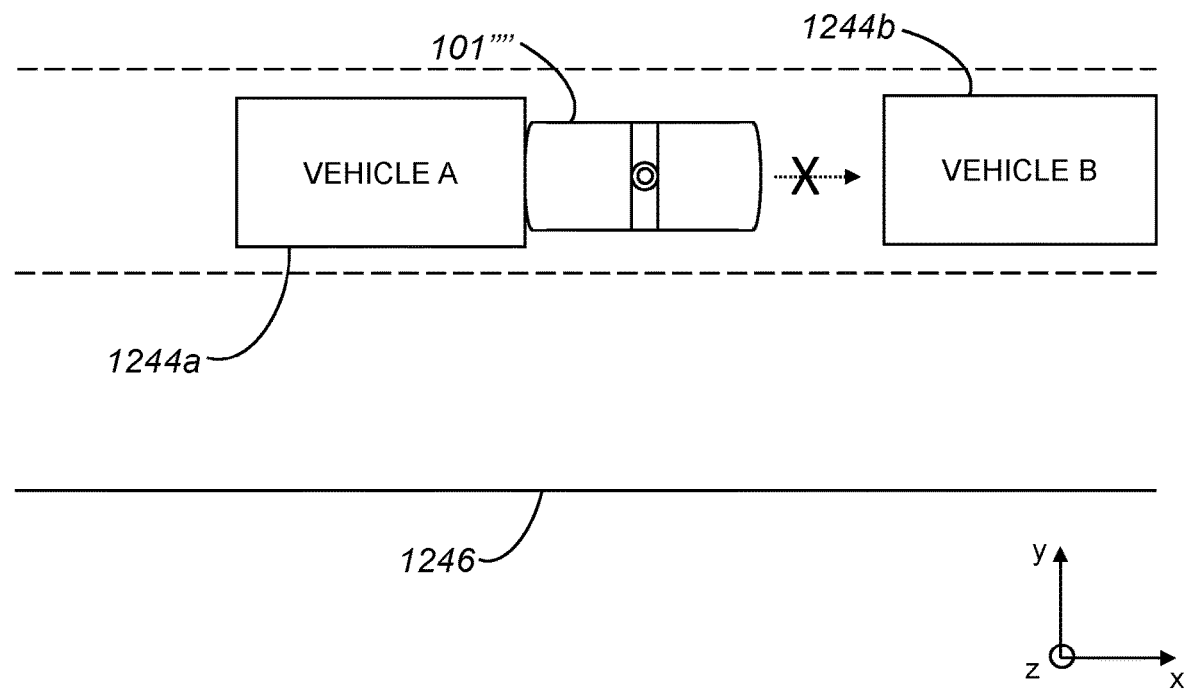
FIG. 12B is a diagrammatic representation of an autonomous vehicle, e.g., vehicle 101'''' of FIG. 12A, at a time t2 after impact in accordance with an embodiment.

With reference to FIGS. 12A and 12B. the deployment of one or more anchors prior to a rear or back impact on an autonomous vehicle, as for example a rear-end collision with respect to the autonomous vehicle, will be described in accordance with an embodiment. FIG. 12A is a diagrammatic representation of an autonomous vehicle, e.g., vehicle 101 of FIGS. 2 and 3, at a time t1 at which the autonomous vehicle deploys an anchor after the first vehicle is identified as about to make impact with a rear of the autonomous vehicle in accordance with an embodiment. At a time t1, autonomous vehicle 101''' is substantially stationary on a surface such as a surface of a road 1246. Vehicle 101''', as shown, is stopped on road 1246 behind a second vehicle 1244b.

A first vehicle 1244a is on a trajectory which, unless first vehicle 1244a managers to change its trajectory, places vehicle 101'''' in the path of first vehicle 1244a such that first vehicle 1244a will impact, collide with, and/or otherwise make contact with a rear of vehicle 101''''. When a primary collision between first vehicle 1244a and vehicle 101'''' is effectively imminent, vehicle 101'''' deploys one or more anchors that effectively anchor vehicle 101'''' to a surface of road 1246.

At a time t2, as shown in FIG. 12B, first vehicle 1244a causes a rear end collision with vehicle 101''''. Because vehicle 101'''' is anchored to a surface of road 1246, vehicle 101'''' does not move significantly in any direction as a result of contact caused by first vehicle 1244a. For example, after impact caused by first vehicle 1244a, vehicle 101'''' does not cause a secondary collision with second vehicle 1244b because vehicle 101'''' is substantially anchored to road 1246.

Figure 13:
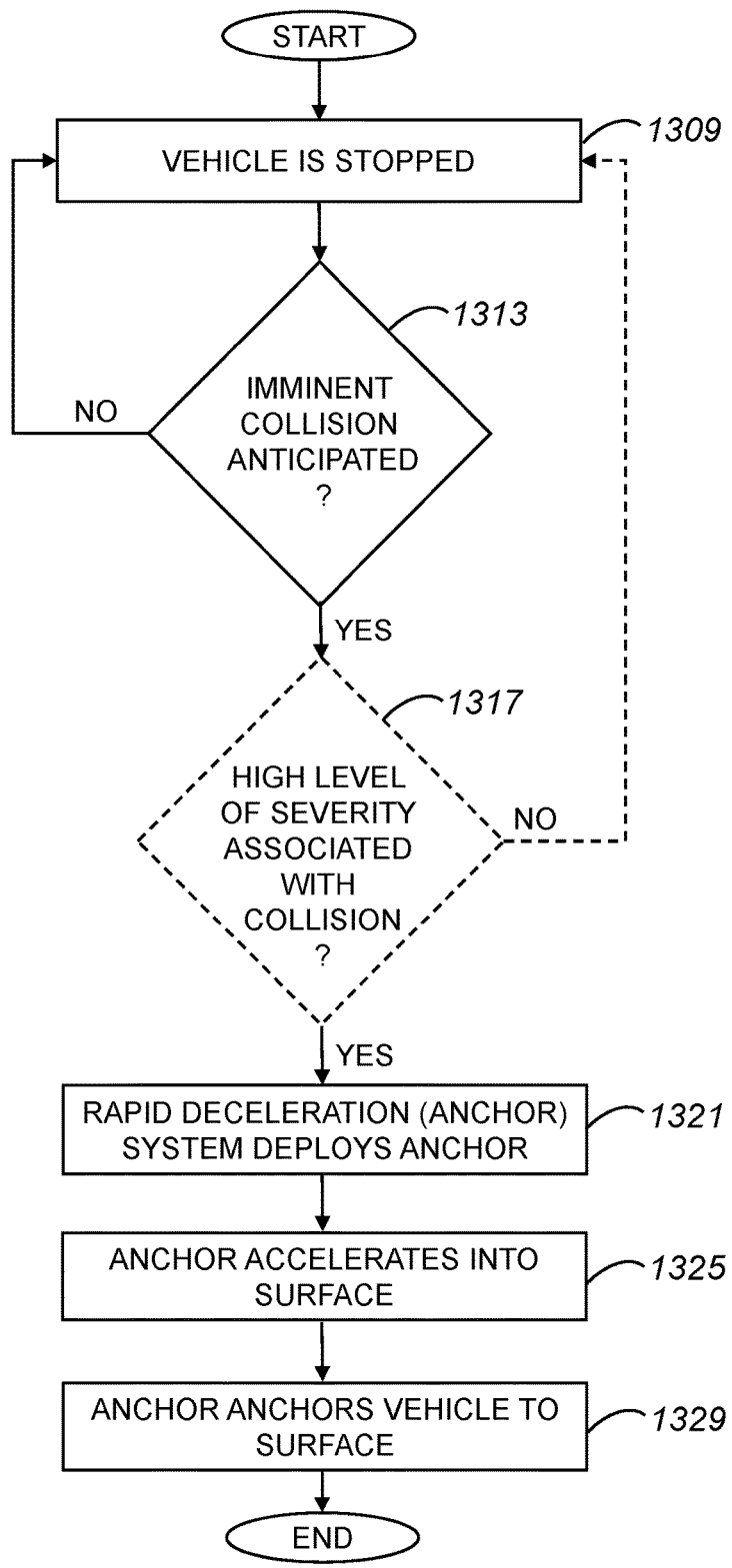
FIG. 13 is a process flow diagram which illustrates a method of enabling a stopped vehicle to respond to an imminent collision in accordance with an embodiment.

When an autonomous vehicle with a rapid deceleration system is stopped and determines that a collision or contact initiated by another vehicle is substantially imminent, the autonomous vehicle may engage or deploy the rapid deceleration system to anchor itself to a road surface. FIG. 13 is a process flow diagram which illustrates a method of enabling a stopped vehicle with a rapid deceleration system to respond to an imminent collision in accordance with an embodiment. A method 1305 of responding to an imminent collision begins at a step 1309 in which a main vehicle, as for example an autonomous vehicle, which includes a rapid deceleration system with at least one anchor is stopped, or substantially motionless. It should be appreciated that the autonomous vehicle is stopped or not currently moving, but is generally powered on or otherwise has an engine running. The autonomous vehicle may be stopped for any suitable reason including, but not limited to including, being stopped at a traffic light, being stopped at an intersection, being stopped at a stop sign, being stopped due to a traffic jam, being stopped due to being parked, etc.

A determination is made in a step 1313 as to whether the autonomous vehicle anticipates an imminent collision, or a substantially unavoidable collision, caused by a moving object such as a moving vehicle, e.g., vehicle "A" or a first vehicle. Such a determination may be made using sensors, e.g., cameras, which may determine a size of the object, a speed at which the object is travelling, a direction from which the object is travelling relative to the autonomous vehicle, and/or a distance between the object and the autonomous vehicle. To determine whether a collision is imminent, a density of the moving object may be estimated based at least in part on historical data, and the mass of the moving object may be determined using the density and information acquire using sensors on the autonomous vehicle such as a camera and/or a lidar. Sensors such as radar, ultrasonic sensors and lidar may also be used to obtain data which allows a braking distance between the moving object and the autonomous vehicle to be estimated based on a speed and a direction identified for the moving object based on the obtained data.

If it is determined in step 1313 that an imminent collision is not anticipated, then process flow returns to step 1309 in which the vehicle remains stopped. Alternatively, if it is determined that an imminent collision is anticipated, process flow proceeds to an optional step 1317 in which a determination is made as to whether a level of severity associated with the anticipated collision is relatively high. In other words, it is determined whether the severity of the anticipated collision exceeds a threshold level of severity. One method of determining the severity of the anticipated collision will be discussed below with respect to FIG. 14.

If the determination in optional step 1317 is that the severity level associated with the anticipated collision is not relatively high, then process flow returns to step 1309 in which the vehicle remains stopped. Alternatively, if it is determined in optional step 1317 that the severity level of the anticipated collision is relatively high, the implication is that a rapid deceleration system such as an anchor system is to be utilized in an effort to reduce the severity of the anticipated collision. That is, if the severity level of the anticipated collision is relatively high, the autonomous vehicle may be anchored to a road surface to reduce the severity of the collision. As such, process flow proceeds to a step 1321 in which a rapid deceleration system, e.g., an anchor system, deploys at least one anchor.

Once at last one anchor is deployed or otherwise launched, the anchor accelerates into a surface, e.g., a surface of a road, in a step 1325. Then, in a step 1329, the anchor anchors the autonomous vehicle to the surface, and the method of responding to an imminent collision is completed.

It should be appreciated that in the method of responding to an imminent collision, as described with respect to FIG. 3, if optional step 1317 in which it is determine whether an anticipated collision has a relatively high level of severity does not occur, process flow may move directly from step 1313 when an imminent collision is anticipated to step 1321 in which an anchor system deploys an anchor if an imminent collision is anticipated. In other words, in one embodiment, an anchor may be deployed by an anchor system if any collision is anticipated, substantially regardless of the severity of the collision.

In one embodiment, a level of severity of an imminent, anticipated collision may be considered when determining whether to deploy a rapid deceleration system such as an anchor system to effectively reduce the severity of the actual collision. For example, if an anticipated collision is determined to be of a relatively low severity, an anchor system may not be deployed as the damage expected to be caused by the anticipated collision may be considered to be minor. Alternatively, if an anticipated collision is determined to be of a relatively high severity, an anchor system may be deployed to reduce or to otherwise mitigate the amount of damage that may be caused by the anticipated collision.

A determination of a level of severity of an anticipated collision between an object, e.g., a first vehicle, and an autonomous vehicle may depend upon a number of different factors, Factors considered may include, but are not limited to including, the types of objects that may to damaged by a secondary collision, whether humans such as vulnerable road users are likely to be injured by a secondary collision, whether animals are likely to be injured by a secondary collision, environmental conditions, and or whether the autonomous vehicle is likely to flip during either the anticipated collision or a secondary collision.

Figure 14:
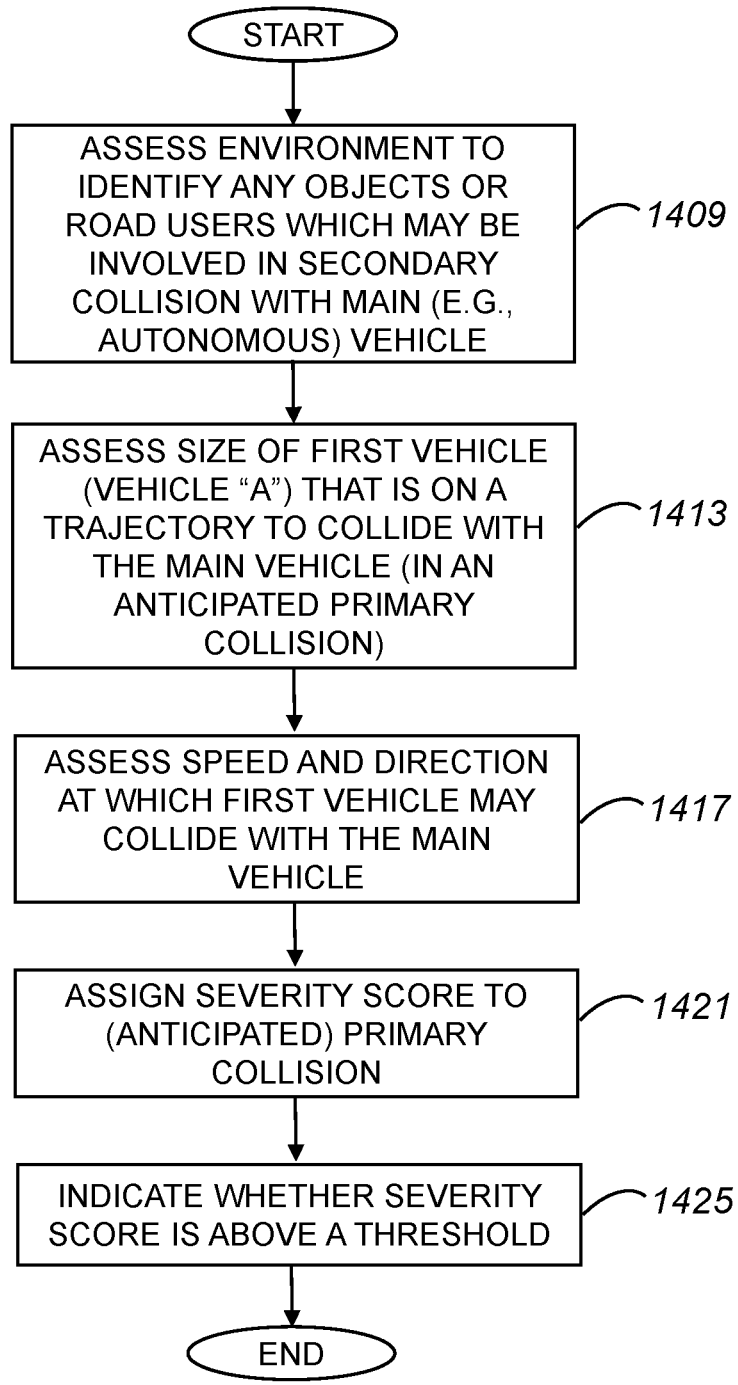
FIG. 14 is a process flow diagram which illustrates a method of determining a level of severity associated with a collision, e.g., step 1317 of FIG. 13, in accordance with an embodiment.

FIG. 14 is a process flow diagram which illustrates a method of determining a level of severity associated with a collision, e.g., step 1317 of FIG. 13, in accordance with an embodiment. Method 1317 of determining a level of severity associated with a collision begins at a step 1409 in which the environment around a main, e.g., autonomous, vehicle with which a primary or first vehicle, e.g., vehicle "A," is assessed. Assessing the environment may include, but is not limited to including, identifying any objects which may be impacted and/or damaged by a secondary collision caused by the main vehicle, identifying any road users that may be impacted and/or damaged by a secondary collision caused by the main vehicle, identifying road conditions, and/or identifying weather conditions.

In a step 1413, a size of the first vehicle that is on a trajectory to collide with the main vehicle and, hence, is anticipated to cause a primary collision is assessed. In other words, a size of the first vehicle in terms of dimensions and weight may be estimated. A size assessment may be made, for example, using information collected by sensors such as a camera on the main vehicle. The collected information may be analyzed to obtain a size, mass, and/or weight estimate.

Once the size of the first vehicle is estimated, the speed at which the first vehicle is travelling and the direction from which the first vehicle is approaching the main vehicle is assessed in a step 1417. It should be appreciated that an amount of and ultrasonic sensors may be used to collect information which may be processed to determine a velocity and a travel trajectory associated with the first vehicle.

After the speed and direction of travel of the first vehicle is assessed, a severity score may be assigned to the anticipated primary collision in a step 1421. The severity score may generally be an indication of how much damage may be caused to the main vehicle, how much damage may be caused by one or more secondary collisions which may result after the anticipated primary collision, and/or the type of objects and/or road users which may be affected by the secondary collision. Higher severity scores may generally be associated with relatively serious secondary collisions, while lower severity scores may generally be associated with less serious secondary collisions. For example, a relatively high severity score may be assigned if a secondary collision is likely to cause injury to a pedestrian or other vulnerable road user, while a relatively low severity score may be assigned if a secondary collision would occur at a low speed and involves a stationary object such as a wall and no vulnerable road users.

In a step 1425, an indication is created which indicates whether the assigned severity score is above a threshold. The threshold may vary widely, and may be used to determine whether to deploy a rapid deceleration system. By way of example, a severity score above or equivalent to a threshold may effectively trigger the deployment of an anchor of an anchor system, while a severity score below the threshold may results in no deployment of an anchor of anchor system. A threshold security score may be determined such that most anticipated primary collisions would trigger the deployment of a rapid deceleration system. The method of determining a level of severity associated with a collision is completed upon generating the indication of whether the severity score is above a threshold.

Although only a few embodiments have been described in this disclosure, it should be understood that the disclosure may be embodied in many other specific forms without departing from the spirit or the scope of the present disclosure. By way of example, while an anchor system of an autonomous vehicle has generally been described as deploying an anchor or a spike into a road surface when there has been contact on a side of the autonomous vehicle, an anchor system may also deploy an anchor when contact on a side of the autonomous vehicle is substantially imminent. That is, an anchor may be deployed to anchor an autonomous vehicle to a road surface in anticipation of a substantially imminent collision.

An anchor may be deployed when a collision force experienced by an autonomous vehicle meets or exceeds a particular threshold. The particular threshold may vary widely. For instance, the threshold may vary depending upon the size of an autonomous vehicle and/or the speed at which the autonomous vehicle is travelling. Alternatively, the threshold may vary depending upon the size of a vehicle which makes physical contact with an autonomous vehicle and/or the speed at which the vehicle is travelling.

The amount of time between when a physical contact is detected on a side of an autonomous vehicle and when an anchor is deployed may vary widely. In one embodiment, the amount of time may be less than approximately fifty microseconds, e.g., between approximately ten microseconds and approximately fifty microseconds. For instance, between approximately ten microseconds and approximately fifty microseconds after a sensor such as an IMU or a MEMS sensor identifies physical contact, an anchor may be deployed or fired.

An anchor system or a rapid deceleration mechanism may be mounted on a vehicle, as for example to a bottom side of a chassis, using any suitable mechanism and/or method. For example, mechanical fasteners such as screws and/or bolts may be used to couple a housing of an anchor system to a chassis of a vehicle.

In one embodiment, after an anchor on an autonomous vehicle is launched or deployed from a launcher as discussed above with respect to FIG. 10, the launcher may crush or otherwise collapse due to forces associated with a side impact on the autonomous vehicle. For example, the launcher may be embodied as a tube that carries an anchor pre-deployment such that, after deployment, the launcher is structurally a hollow tube. Such a hollow tube may, when crushed, flatten such that the flattened tube is unlikely to penetrate components of an autonomous vehicle during or after a side impact collision. It should be appreciated that in some situations, a deployed anchor may remain partially within the launcher. When an end of a deployed anchor is supported at least partially within an opening of the launcher, a pointed end of the deployed anchor may be embedded in a road surface and a significant portion of the launcher may be substantially hollow and empty.

When an autonomous vehicle includes an external airbag, the external airbag and an anchor may be deployed at approximately the same time when a side impact is detected or is substantially imminent. That is, an anchor may be deployed when it is determined that an external airbag is to be deployed. Sensors used to determine when to deploy an external airbag on an autonomous vehicle may generally be used to determine when to deploy an anchor.

Factors used in determining the severity of an anticipated collision and, in some embodiments, when to deploy at least one anchor of an anchor system, may vary widely. For example, an anticipated collision may be characterized or otherwise identified as having a high severity level if there is any risk of injury to a living being such as a human or an animal. As another example, an anticipated collision may be characterized or otherwise identified as having a low severity level if damage is substantially only to vehicles involved in the anticipated collision, with no risk of injury to any human or animal.

In one embodiment, sensors such as cameras and/or lidars on an autonomous vehicle may be used to identify objects which may be subject to a secondary collision involving the autonomous vehicle. A substantially imminent impact may be identified using data obtained from the cameras and/or lidars. To determine the volume and the shape of an object which may impact an autonomous vehicle in a primary collision, sensor data may be used to calculate an approximate centroid of the object, and use that centroid as an estimation of a point at which a velocity vector effectively attaches. Using an estimated mass of the object, as determined for example using sensors and historical data, a kinetic energy, an angle of impact, and a position of impact on the autonomous vehicle maybe be determined. In one embodiment, the kinetic energy and the position of impact may be used to determine whether an anchor is to be deployed to anchor the autonomous vehicle.

By measuring or otherwise estimating a volume and a shape of an object that is about to cause an imminent impact with an autonomous vehicle, a centroid and mass of the object may be determined. Upon determining a kinetic energy associated with the object using a velocity and a mass of the object, a vector of impact may be determined and a location of impact on an autonomous vehicle may be determined, as discussed above. The severity of the impact may then be determined, and effectively scored, to determine in some embodiments whether or not the autonomous vehicle will deploy an anchor.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:
1. A method comprising:
 identifying a condition relating to an impact on a vehicle by an object, wherein the vehicle includes at least one anchor mechanism, the at least one anchor mechanism configured to anchor the vehicle to a surface;
 determining whether the condition indicates that the anchor mechanism is to be deployed; and
 deploying the anchor mechanism when it is determined that the condition indicates that the anchor mechanism is to be deployed, wherein the condition relating to the impact is a determination that the impact is imminent, and wherein the condition is identified when the vehicle is stopped.

2. The method of claim 1 wherein when the condition is the determination that the impact is imminent, it is determined that the condition indicates that the anchor mechanism is to be deployed, and wherein the at least one anchor mechanism includes a first anchor and deploying the anchor mechanism include deploying the anchor into the surface.

3. The method of claim 1 wherein the condition relating to the impact includes an estimated severity level associated with the impact, and wherein determining whether the condition indicates that the anchor mechanism is to be deployed includes determining whether the estimated severity level exceeds a threshold level.

4. The method of claim 3 wherein the anchor mechanism includes an anchor, and wherein when it is determined that the estimated severity level exceeds the threshold level, it is determined that the anchor mechanism is to be deployed and deploying the anchor mechanism includes deploying the anchor into the surface.

5. The method of claim 3 wherein identifying the estimated severity level associated with the impact includes at least one selected from a group including assessing an environment around the vehicle and assessing a source of the impact.

6. The method of claim 1 wherein the vehicle is an autonomous vehicle, and wherein determining whether the condition indicates that the anchor mechanism is to be deployed includes identifying at least one selected from a group including a centroid of the object and an estimated mass of the object.

7. A vehicle comprising:
a chassis; and
a propulsion system, the propulsion system carried on the chassis and configured to enable the vehicle to move, wherein the propulsion system includes an anchor system, the anchor system including an anchor and being configured to deploy the anchor to anchor the vehicle to a surface in response to a condition, the condition being associated with an impact on the vehicle by an object, wherein the impact is an imminent impact, the condition being associated with identifying the imminent impact, wherein the vehicle is stopped when the imminent impact is identified.

8. The vehicle of claim 7 wherein the condition is associated with identifying an estimated severity of the imminent impact, wherein the vehicle is stopped when the estimated severity of the imminent impact is identified.

9. The vehicle of claim 8 wherein the anchor system includes a deployment activation arrangement, the deployment activation arrangement is configured to identify the estimated severity level of the imminent impact by assessing at least one selected from a group including an environment around the vehicle and a source of the imminent impact.

10. A vehicle comprising:
a chassis;
a propulsion system, the propulsion system carried on the chassis and configured to enable the vehicle to move, wherein the propulsion system includes an anchor system, the anchor system including an anchor and being configured to deploy the anchor to anchor the vehicle to a surface in response to a condition, the condition being associated with an impact on the vehicle by an object, wherein the impact is an actual impact of the object with the vehicle; and
a sensor system, the sensor system carried on the chassis and configured to identify the condition, wherein the sensor system includes a side impact sensor arrangement configured to identify the condition by determining a force associated with the impact when the impact is a side impact, wherein the vehicle has a front, a back, and a side, and wherein when the impact is the side impact on the side, the side impact sensor arrangement system is configured to detect the side impact and to identify the condition after the impact occurs, the side impact sensor arrangement further being configured to determine a direction and a magnitude of a force vector associated with the side impact.

11. The vehicle of claim 10 further including:
an autonomy system carried on the chassis, wherein the propulsion system is configured to cooperate with the autonomy system to enable the vehicle to drive autonomously.

12. The vehicle of claim 10 wherein the anchor system further includes a sensor arrangement and an energetics arrangement, the sensor arrangement configured to cause the anchor to deploy in response to the condition, the energetics arrangement configured to propel the anchor into the surface when the anchor is deployed.

* * * * *